Nov. 10, 1931.  C. H. WISHMEIER  1,830,819

METHOD OF MAKING TIRE COVERS

Filed Nov. 11, 1929

INVENTOR.
Charles H. Wishmeier,
BY Minturn & Minturn,
Attorneys.

Patented Nov. 10, 1931

1,830,819

UNITED STATES PATENT OFFICE

CHARLES H. WISHMEIER, OF INDIANAPOLIS, INDIANA, ASSIGNOR TO FABRIC PRODUCTS CORPORATION, OF INDIANAPOLIS, INDIANA, A CORPORATION OF INDIANA

METHOD OF MAKING TIRE COVERS

Application filed November 11, 1929. Serial No. 406,435.

This invention relates to the art of making covers for extra or spare tires as are commonly carried for emergency use on automobiles and the like. Heretofore it has been customary to make a cover by two general methods. One of such methods has been to cut a number of arcuate sections and then join them end to end to form a continuous circular covering, but the difficulty of this method has been that when the machine operator unites the various ends, there would be more or less variation from the true circle so that the completed cover would not fit circumferentially but display wrinkles therearound. The other method has been to cut the rear section in one piece which meant that the circular or substantially circular part in the center had to be cut out and discarded thereby causing a very great waste of material since the discarded section was of such size and shape as to have little or no use for other purposes.

It is the primary purpose of my invention to prevent this waste of material and to provide a method of cutting and forming the cover as will insure a smooth, glove-like fit when the cover is applied to the tire.

I accomplish these and other objects by the means and method as illustrated by the accompanying drawing, in which—

Figure 1:
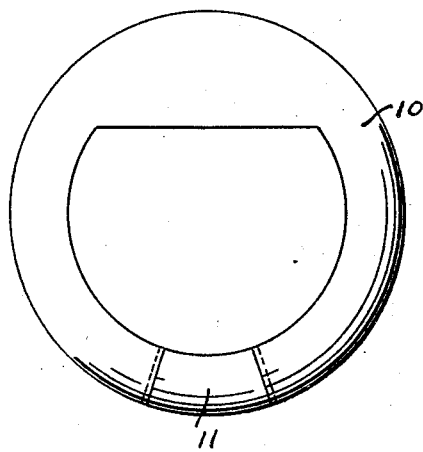
Figure 2:
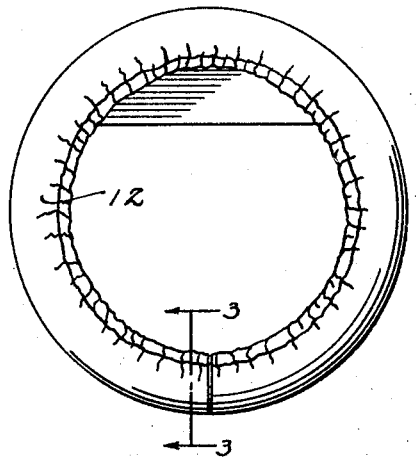
Figure 4:
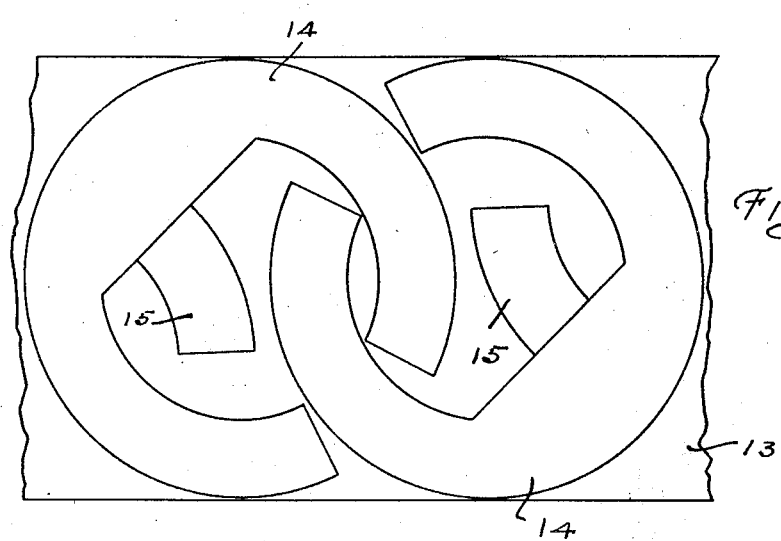
Figure 3:
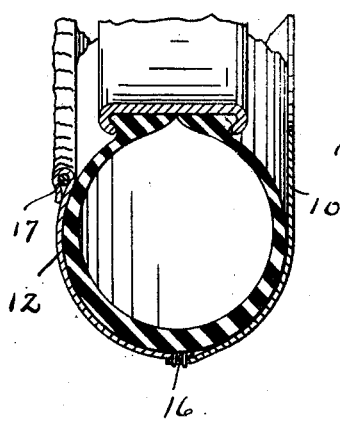

Fig. 1 is a rear elevation of a tire cover embodying my invention;

Fig. 2, a front elevation of the cover;

Fig. 3, a section through the cover on the line 3—3 in Fig. 2 as applied to a tire; and Fig. 4, a diagrammatic view of the plan of cutting members of the cover from the material to be employed.

Like characters of reference indicate like parts throughout the several views in the drawings.

Referring to Figs. 1 and 2, I form a tire cover consisting essentially of a rear piece 10 united by the lower piece 11 and a front piece 12 having the customary tension or draw member carried around its inner hem.

The front section 12 has the usual circular opening therethrough and the rear section 10 has the upper portion of the opening therethrough reduced in area by dropping the upper portion downwardly to pass thereacross on a chord, this upper portion forming a suitable place for identifying or advertising matter.

Referring now to Fig. 4, wherein a length of material 13 is indicated, a number of patterns 14 of the piece 10 are laid thereon to have the arcuate end of one pattern entering through the opening between the ends of the next adjacent pattern so as to bring the two patterns 14 closely together and permit the end of one to extend to within the circular space of the other. Patterns 15 of the piece 11 occupy another part of the space between the legs of each pattern 14 and preferably have one end coinciding to the chordal line of the pattern 14 so that one cut thereacross will serve both patterns.

It is thus to be seen that by the peculiar formation of the parts 10 and 11, the space heretofore wasted is used to a good advantage, not only effecting a saving of that central space but also permitting more pieces 10 to be cut from the same length of the material 13. Since the piece 10 defines a circle by reason of its one piece construction having the long arcuate legs, the piece 11 may be placed in the gap therebetween easily without causing any material change from the true circumference.

The united pieces 10 and 11 are then attached to the front piece 12 in the customary manner through the circumferential seam 16, the piece 12 being puckered and gathered as demanded by the pull of the elastic member 17, the appearance of the member 12 being of no particular importance since it is concealed from view. By dropping the upper portion of the piece 10 as indicated, the arcuate legs are more readily held in their circular relation when the piece 11 is inserted and secured therebetween.

I claim:

The method of cutting tire cover faces from material consisting of cutting substantially an annular piece of suitable diameter from the material and leaving a neck of material across from the material joining with the center left from the annular piece, and of cutting a second similarly shaped annular piece from the material with an opening thereacross as left in the material on removing the first piece, cutting across said neck and around through said center arcuately toward said opening to form part of the second piece integrally therefrom, and cutting arcuate pieces from the remainder of said centers for filling in the openings across the annular pieces.

In testimony whereof I affix my signature.

CHARLES H. WISHMEIER.